United States Patent

[11] 3,556,058

[72] Inventor  Leonard Smiler
        3915 Fenkill Ave., Southfield, Mich. 48075
[21] Appl. No. 794,487
[22] Filed    Jan. 28, 1969
[45] Patented Jan. 19, 1971

[54] COLLAPSIBLE WIRE GRILLE CAGE
     2 Claims, 3 Drawing Figs.
[52] U.S. Cl. ............................................. 119/17
[51] Int. Cl. ............................................. A01k 01/00
[50] Field of Search .................................. 119/17, 19;
                                                   220/19, 4, 6, 7

[56] References Cited
     UNITED STATES PATENTS

| | | | |
|---|---|---|---|
| 1,129,011 | 2/1915 | Pyle | 220/6X |
| 1,669,300 | 5/1928 | Hunter | 220/6 |
| 2,892,562 | 6/1959 | Smithson | 119/17X |
| 3,058,445 | 10/1962 | Johnson | 119/17 |

Primary Examiner—Hugh R. Chamblee
Attorney—Hauke, Gifford and Patalidis

ABSTRACT: A collapsible cage or pen for small animals formed from six wire grille panels having detachable hinging means that allow the cage to be separated into two pieces of three hinged sections each. Each piece is composed of a side panel having an end and a top or bottom panel hinged to it. The end and top or bottom panels are folded over forming two pieces no larger in rectangular area than the side panel.

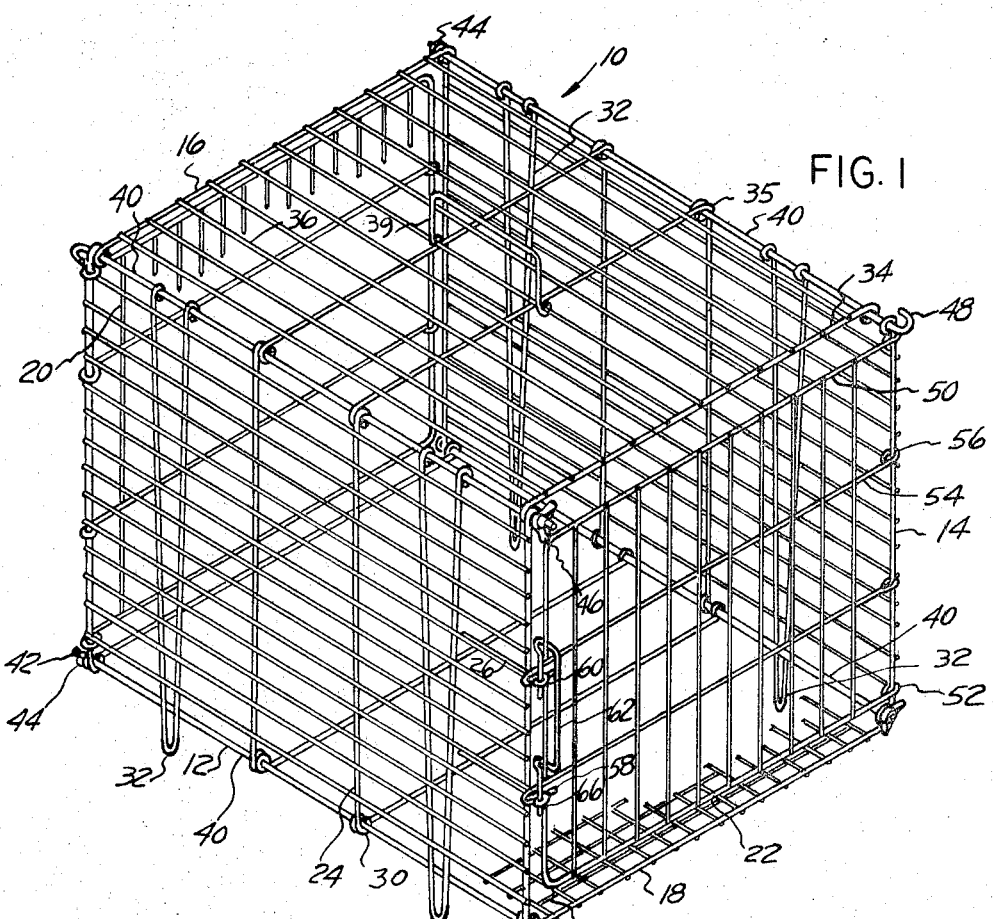

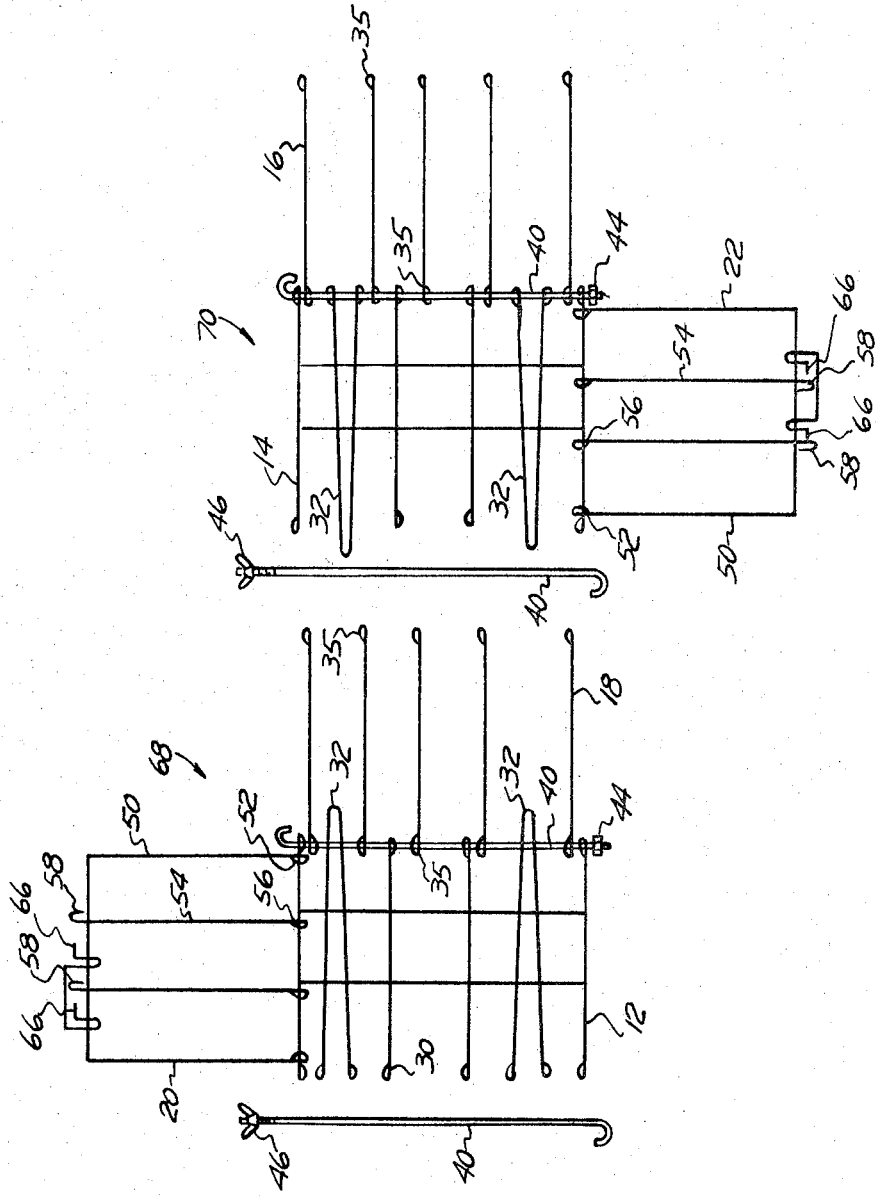

COLLAPSIBLE WIRE GRILLE CAGE

BACKGROUND OF THE INVENTION

1. Field of the Invention

This invention relates to cages or pens and more particularly to collapsible cages or pens for small animals.

2. Description of the Prior Art

Various types of wire grille cages have been used for animal enclosures. One such collapsible cage disclosed in U.S. Pat. No. 2,892,562, issued June 30, 1959, to W. K. Smithson, is comprised of six wire grille panels. The two panels forming the two sides of the cage are hingedly secured along their top and bottom horizontal edges to two panels forming the top and bottom of the cage. A first end panel forming one of the doors of the cage has one of its vertical edges hingedly secured to a vertical edge of one of the side panels. The other vertical edge of the end panel and a vertical edge of the other side panel have latching means for retaining the door in a closed position. The second end panel forming a second cage door is hingedly secured to one of the edges of the bottom panel. The two vertical edges of the panel and the vertical edges of the two side panels have latching means for retaining the door in a closed position.

The cage is collapsed by folding the first end panel inwardly against the inner surface of the side panel to which it is hingedly secured. The second end panel is folded inwardly so as to be adjacent the floor panel. The cage is then collapsed by folding to one side.

This arrangement has the disadvantage of requiring a large rectangular area for storage, since the height of the cage is added to the rectangular size of the bottom panel on being collapsed.

SUMMARY OF THE INVENTION

The present invention overcomes the limitations of the prior art by providing a collapsible cage formed of six wire grille panels. One of the side panels is hinged to the bottom and end panel and detachably hinged to the top panel. The other side panel is hinged to the top and the other end panel and detachably hinged to the bottom panel. The two end panels forming cage doors are each fabricated with a pair of elongated eyelets in a vertical plane attached to the free swinging vertical edge of the panels. The eyelets engage a pair of horizontal circular eyes secured to the vertical edge of the opposed side panel. The eyelets are of sufficient length to encompass the horizontal eyes and are retained by a pin mechanism formed from a single piece of wire slidably mounted on a vertical rail of the end panel and which includes a vertically extending pin at each end of the piece for projecting through the eyelets.

Each detachable hinge consists of a long rod that is hooked at one end and threaded at the other for securing a wing nut. The rod extends through coaligning loops on the two hinged panels. When the wing nuts are removed from the ends of the two rods, the rods may be withdrawn from the loops allowing the cage to be disassembled into two members having three panel portions each. Two of the panel portions of each member are folded over the third portion forming two rectangular pieces, each being no larger in rectangular area than one of the side panels. The two members may be stacked one on top of the other for storage.

This arrangement has the advantage over prior collapsible wire grille cages of being collapsible into two rectangular pieces, each piece being no larger in rectangular area than one of the side panels. Furthermore, a simply constructed pin mechanism is employed on each end panel eliminating the need for a chain or other means for securing the pins to the cage.

BRIEF DESCRIPTION OF THE DRAWINGS

The description refers to the accompanying drawings in which like reference characters refer to like parts throughout the several views and in which:

FIG. 1 is a perspective view of a preferred form of a cage embodying this invention;

FIG. 2 is an enlarged fragmentary perspective view of a portion of the cage shown in FIG. 1 illustrating more clearly the locking means for the door; and FIG. 3 is a diagrammatic plan view of the cage in disassembled condition and positioned to show the connection between the panels.

DESCRIPTION OF THE PREFERRED EMBODIMENT

Referring to the drawings, FIG. 1 illustrates a preferred embodiment of a collapsible cage 10 comprising sides 12 and 14, top 16, bottom 18 and hinged end panels 20 and 22, all made of resilient wire grille. Side panels 12 include vertical braces 24 of a heavy-gauge wire. Each side includes longitudinal braces 26 attached as by welding to the vertical braces 24 at spaced intervals to form a rigid grillelike panel. Each brace 24 is formed with a turned-back loop 30 at both of its ends, except the eight braces extending below the bottom panel 18 to form the four legs 32.

The top 16 and bottom 18 are similarly made of wire and consist of four cross braces 34 having turned-back loops 35 at each end thereof. Spaced longitudinal wires 36 are secured to the braces 34 on the top and bottom panels. In addition the bottom panel 18 has a plurality of spaced wires 38 parallel to braces 34. The top panel includes a handle 39 hingedly secured to one of the longitudinal wires.

Side pen panels 12 and 14, top 16 and bottom 18 are hingedly secured together by means of rods 40 inserted through coaligning loops 30 and 35 of the four panels and secured at the threaded ends 42 by nuts 44 and wing nuts 46. The other end of rods 40 are hooked at 48 to prevent the rods from being drawn through the loops.

End panels 20 and 22 which may be termed as doors are also fabricated of wire materials. Each door consists of a wire frame member 50 hingedly secured to one of the braces 24 of one of the side panels by turned-back looped ends 52. Intermediate horizontal rails 54 are provided with similar turned-back loops 56 at the hinged end, and are additionally provided at their opposite ends with elongated eyelets 58 in the plane of the door to provide locking engagement with horizontal circular eyes 60 formed on intermediate cross braces 26. The eyelets 58 are of sufficient length to encompass the eyes 60 and are retained by pin mechanism 62. Mechanism 62, as shown in FIG. 2, is formed from a single piece of wire slidably mounted on the vertical portion of frame member 50. Mechanism 62 includes a vertically extending pin 66 at each end for projecting through the horizontal eyes 60. Vertical rails 64 are secured to rails 50 and 54 of the end panels at spaced intervals.

Although the cage 10 is of rigid construction when the doors are latched, the cage is readily collapsible by removing wing nuts 46 from the two threaded rods 40 hinging side 12 to top 16 and side 14 to bottom 18. When the two rods are withdrawn from loops 30 and 35, the cage 10 can be separated into two separate members generally indicated at 68 and 70, as shown in FIG. 3. Member 68 is comprised of side 12, bottom 18, and end 20. Member 70 is comprised of side 14, top 16, and end 22. End 20 is folded over so as to be adjacent side 12 with bottom 18 folded over on top of end 20. End 22 is folded over so as to be adjacent side 14 with top 16 folded over on top of end 22. The two members 68 and 70 can then be stacked one on top of the other for storage or shipment.

This arrangement provides a number of advantages over prior collapsible wire grille cages. Prior collapsible cages have the disadvantage of requiring a large rectangular area for storage, since they fold over to one side forming a flat rectangular piece of the same length as the original cage but having a width equal to the width of the bottom panel plus the height of the side panel. The cage of the present invention collapses into two rectangular pieces, each having the same length as the original cage but being no wider than the height of the cage.

The two pieces are stacked one on top of another for storage. Furthermore, an inexpensive pin mechanism slidably mounted on the cage is provided that eliminates the need for a chain or other means for securing the pins to the cage.

A further advantage in lowering cost is provided by employing similar or identical pieces for different parts of the cage. As illustrated in FIG. 2, side 12 and end 20 are identical to side 14 and end 22. Except for braces 38 on the bottom panel, top 16 and bottom 18 are identical. Rods 40 are all identically formed. Thus, an inexpensive cage has been disclosed using similar pieces for its different parts and being collapsible into two pieces, each piece being no larger in rectangular area than one of the side panels.

I claim:

1. A collapsible wire cage for animals comprising:

six interconnected wire, grille-type panels defining a compartment;

a bottom panel having a pair of parallel edges, means carried by one of said edges for hingedly connecting it to the bottom horizontal edge of a first side panel and means carried by the other of said edges for detachably hinging it to the bottom horizontal edge of a second side panel;

said top panel having a pair of parallel edges, means carried by one of said edges for hingedly connecting it to the top horizontal edge of said second side panel and means carried by the other of said edges for detachably hinging it to the top horizontal edge of said first side panel;

said first end panel having a pair of parallel, vertical edges, one of said edges being hingedly secured to a first vertical edge of one of the side panels, and the other of said edges and a first vertical edge of the other side panel containing locking means to retain said first end panel in a closed position;

said second end panel having a pair of parallel, vertical edges, one of said edges being hingedly secured to a second vertical edge of one of the side panels, and the other of said edges and a second vertical edge of the other side panel containing locking means to retain said second end panel in a closed position; and each of said locking means including a pair of horizontal wire elements attached to the end panel, each element being provided with an eyelet in the plane of the end panel projecting from the free-swinging vertical edge of the end panel, the side panel adjacent said eyelets having a pair of horizontal wire elements each provided with a generally circular eye in the horizontal plane projecting beyond the edge thereof and through the eyelet of the end panel wire element when the end panel is in the closed position, and locking pin means formed from a single piece of wire slidably mounted on a vertical wire element of the end panel and having pins formed at each end of the piece for projecting through said circular eyes.

2. A collapsible wire cage for animals comprising:

six interconnected wire, grille-type panels defining a compartment;

a bottom panel having a pair of parallel edges, means carried by one of said edges for connecting it to the bottom horizontal edge of said first side panel and means carried by the other of said edges for connecting it to the bottom horizontal edge of a second side panel;

said top panel having a pair of parallel edges, means carried by one of said edges for connecting it to the top horizontal edge of said second side panel and means carried by the other of said edges for connecting it to the top horizontal edge of said first side panel;

said first end panel having a pair of parallel vertical edges, one of said edges being hingedly secured to a first vertical edge of one of the side panels, and the other of said edges and a vertical edge of the other side panel containing locking means to retain said first end panel in a closed position;

said second end panel having a pair of parallel, vertical edges, one of said edges being secured to a second vertical edge of one of the side panels, and means securing a second vertical edge of the other side panel and the other of said vertical edges;

said locking means including a pair of horizontal wire elements attached to the end panel, each of said wire elements being provided with an eyelet in the plane of the end panel projecting from the free-swinging vertical edge of the free end panel, the side panel adjacent said eyelets having a pair of horizontal wire elements each provided with a generally circular eye in the horizontal plane projecting between the edge thereof and through the eyelet of the end panel wire element when the end panel is in the closed position; and locking pin means formed from a single piece of wire slidably mounted on a vertical wire element of the end panel and having pins formed at each end of the piece for projecting through the circular eyes.